United States Patent
Yasaki et al.

(10) Patent No.: US 7,152,114 B2
(45) Date of Patent: Dec. 19, 2006

(54) SYSTEM, SERVER AND TERMINAL FOR SWITCHING LINE IN LOCAL AREA NETWORK

(75) Inventors: Kouichi Yasaki, Kawasaki (JP); Katsutoshi Yano, Kawasaki (JP); Toshihiro Azami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 10/080,623

(22) Filed: Feb. 25, 2002

(65) Prior Publication Data

US 2002/0091858 A1  Jul. 11, 2002

(30) Foreign Application Priority Data

Nov. 30, 2001  (JP) .............................. 2001-366006

(51) Int. Cl.
*G06F 15/173* (2006.01)
(52) U.S. Cl. .................................................... 709/238
(58) Field of Classification Search ................ 709/238, 709/249; 370/229, 230
See application file for complete search history.

(56) References Cited

U.S. PATENT DOCUMENTS

| | | | | |
|---|---|---|---|---|
| 6,275,497 | B1* | 8/2001 | Varma et al. ................ | 370/431 |
| 6,694,350 | B1* | 2/2004 | Kurashima et al. ......... | 709/203 |
| 6,775,709 | B1* | 8/2004 | Elliott ......................... | 709/238 |
| 7,012,705 | B1* | 3/2006 | Yoshida ...................... | 358/1.15 |
| 2002/0147836 | A1* | 10/2002 | Flanagin ..................... | 709/238 |

FOREIGN PATENT DOCUMENTS

| | | | |
|---|---|---|---|
| DE | 19819802 | * | 11/1999 |
| EP | 0987866 | * | 3/2000 |
| JP | 9-305508 | | 11/1997 |
| JP | 10-023071 | | 1/1998 |
| JP | 11-205372 | | 7/1999 |
| JP | 2000-183941 | | 6/2000 |
| JP | 2000-261468 | | 9/2000 |
| WO | WO 00/05909 | | 2/2000 |

OTHER PUBLICATIONS

Lim, Alvin; "Improving Performance of Adaptive Media Access Control Protocols for High-density Wireless Networks"; 1999; IEEE; pp. 316-321.*
09-305508, Nov. 1997, Japan, Ueda Tadashi, Machine Translation.*
Communication from Japanese Patent Office for corresponding Appln. No. 2001-366006 dated Nov. 2005.

\* cited by examiner

*Primary Examiner*—William Vaughn
*Assistant Examiner*—J. Bret Dennison
(74) *Attorney, Agent, or Firm*—Staas & Halsey LLP

(57) ABSTRACT

A system for switching lines in a local area network is provided in which plural types of communication lines are used, and streaming information is continuously and smoothly transmitted to the terminal via a server when a terminal switches the communication line. The server comprises a buffer cumulating transmission or reception data for the latest predetermined quantity in each communication line and a switch processing portion for performing a switching process of the plural communication lines. The switch processing portion includes a switch request receiving portion for receiving a request to switch the line and the address in the buffer corresponding to data that are already received by the terminal transmitted by the terminal, a line selecting portion for selecting an appropriate communication line in response to the request to switch the line, a switch instruction transmitting portion for transmitting an instruction of switching to the selected communication line and the address in the buffer corresponding to data that are already received by the server, and a data destination switching portion for transferring packet data received for the terminal corresponding to the communication line before the switching to the communication line after the switching.

11 Claims, 13 Drawing Sheets

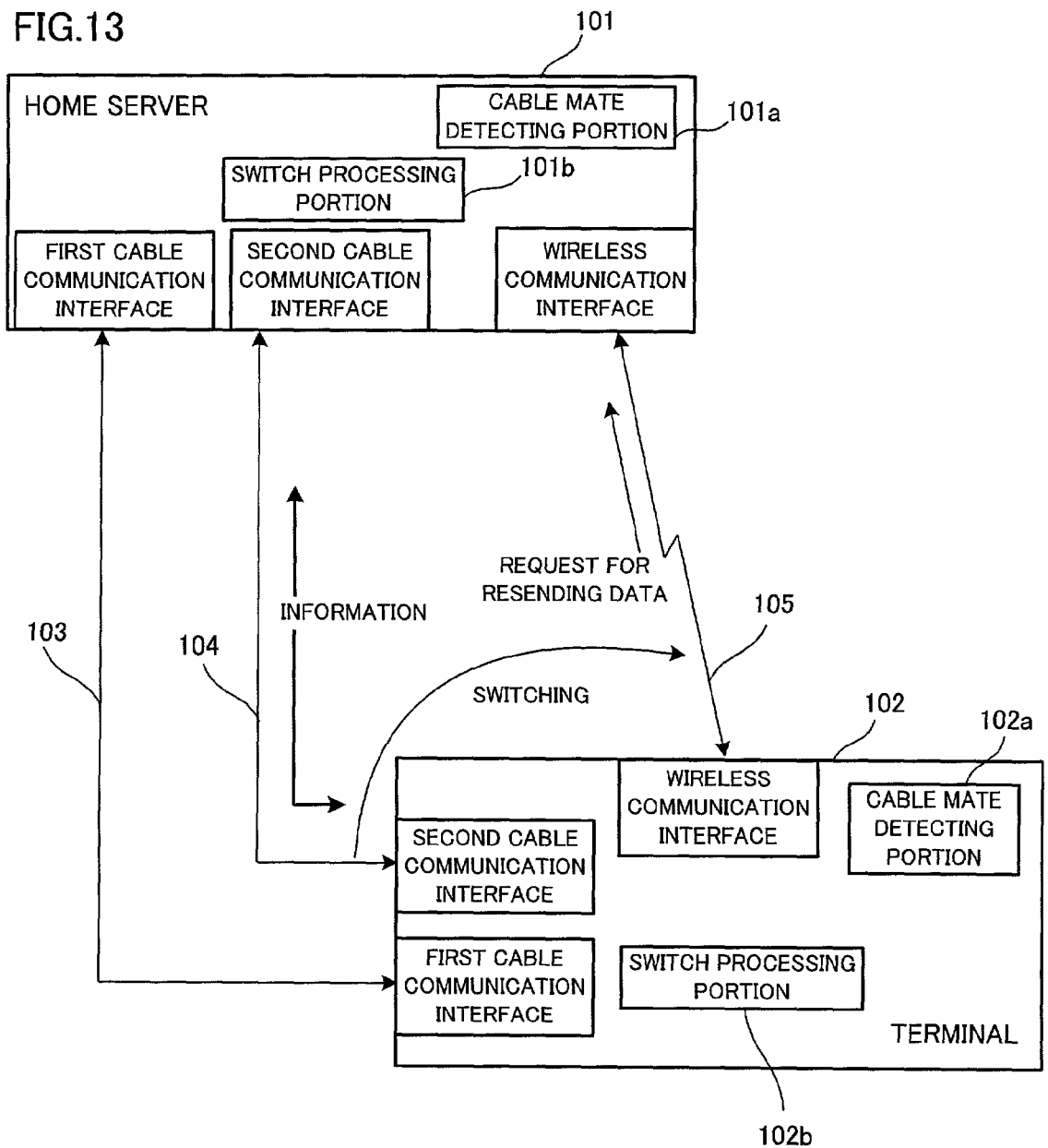

SYSTEM, SERVER AND TERMINAL FOR SWITCHING LINE IN LOCAL AREA NETWORK

BACKGROUND OF THE INVENTION

1. Field of the Invention

The present invention relates to a line switching system for switching a communication line smoothly that is transmitting data when plural types of communication lines can be used in a local area network such as a home LAN. The present invention also relates to a server and a terminal of the system.

2. Description of the Prior Art

In recent years, computer networks become commonplace, and especially the Internet through which various world wide network services can be obtained easily has become significantly widespread. As an access line to the Internet, broadband lines have gained the spotlight, which include an asymmetric digital subscriber line (ADSL) that uses a usual telephone line, a cable television (CATV) and a fiber to the home (FTTH) that uses an optical fiber. There are increasing number of people who use the service for high speed connection to the Internet utilizing the broadband line and download contents (streaming information) such as a music or a video via the Internet for listening or viewing.

Moreover, it is also common to build a home network (or a home LAN) that connects plural terminals (e.g. personal computers) at home using Ethernet (a trademark), a wireless LAN, power-line LAN or others, so that plural terminals can connect to the Internet via a router (or a home server). In such a home network, a certain line can be hardly used in a certain place within a house.

For example, when using a portable terminal such as a note type personal computer with moving within a house, the terminal can be connected to the home network via the Ethernet (a trademark) line in a certain place. In another place, however, it can happen that an Ethernet (a trademark) cable cannot be laid so that another line (e.g., a wireless line) should be used. In this case, a technique for switching from the Ethernet (a trademark) line to the wireless line is necessary.

A conventional example of such a line switching technique in a local area network (LAN) is disclosed as a communication terminal in Japanese unexamined patent publication No. 9-305508. In this device, a terminal detects a mating or unmating of a communication cable or a connection state in communication without user's operation of the terminal, so as to switch a network connection interface at the terminal side automatically.

As another conventional example, there is a network connection device that is described in Japanese unexamined patent publication No. 2000-261468. This device switches a method for transmitting video information in accordance with a communication interface of another device that is connected to the device in a video information network using an interface of IEEE1394.

FIG. 13 is block diagram of a conventional line switching system in a usual home network. In this example, two cable communication lines 103 and 104 and one wireless communication line 105 are provided as communication interfaces (communication lines) between a home server 101 and a terminal (e.g., a note type personal computer) 102. For example, the first cable communication line 103 is a communication line utilizing a power-line carrier, the second cable communication line 104 is an Ethernet (a trademark) line using an unshielded twisted pair (UTP) cable, and the wireless communication line 105 is a wireless communication line based on the standard IEEE802.11.

The home server 101 comprises a cable mate detecting portion 101a for detecting a mating or unmating of a communication cable and a switch processing portion 101b for switching lines in accordance with the detection result. The terminal 102 also comprises a cable mate detecting portion 102a and a switch processing portion 102b.

In the conventional line switching method, when the terminal 102 moves, the terminal 102 determines which line should be used after switching. Therefore, the terminal 102 has to transmit a request to resend the data to the home server 101 using the line after switching. There is a problem that if the terminal 102 was receiving streaming information such as a video, the video is paused when the line is switched.

There is another problem that it is difficult that the home server 101 switches the line in synchronization with the terminal 102 side, so a load of an application will be increased for the processing the request to resend the streaming information, which was received from the terminal 102 when the line is switched.

The streaming information that is transmitted to a terminal via a home server (a router) does not flow in all lines but flows only in the line that the terminal is connected originally for using bands efficiently. Therefore, it is important that if the line connected to the terminal is switched, the home server (may be referred to simply as a server) must respond to the switching and switch the line for sending the streaming information smoothly.

For example, if a communication speed changes (especially to a low speed) due to a line switching in a home network, it is necessary to consider the influence of the speed change so that streaming information can be received correctly. It is also necessary to design so that the streaming information is not dropped out corresponding to the time period necessary for the switching.

SUMMARY OF THE INVENTION

An object of the present invention is to realize a system for switching lines in a local area network that uses plural types of communication lines, in which streaming information that is transmitted to a terminal via a server can be transmitted smoothly and continuously when the communication line connected to the terminal is switched.

The present invention provides a server of a local area network in which the server is connected with a terminal (i.e., a client) via a communication line selected from plural communication lines. The server comprises a buffer for cumulating transmission or reception data for the latest predetermined quantity in each communication line and a switch processing portion for performing a switching process of the plural communication lines. The switch processing portion includes a switch request receiving portion for receiving a request to switch the line and the address in the buffer corresponding to data that are already received by the terminal transmitted by the terminal, a line selecting portion for selecting an appropriate communication line in response to the request to switch the line, a switch instruction transmitting portion for transmitting an instruction of switching to the selected communication line and the address in the buffer corresponding to data that are already received by the server, and a data destination switching portion for transferring packet data received for the terminal corresponding to the communication line before the switching to the communication line after the switching.

In a preferred embodiment, the server further comprises a line performance measuring portion for measuring performance of each of the plural communication line including a communication speed, and the line selecting portion selects an appropriate communication line in accordance with measurement result of the line performance measuring portion.

More preferably, the line performance measuring portion measures performances including communication speeds of the plural communication lines when the switch request receiving portion receives the request to switch the line from the terminal.

The present invention also provides a terminal of a local area network in which the terminal is connected to a server via a communication line selected from plural communication lines. The terminal comprises a buffer for cumulating transmission or reception data for the latest predetermined quantity in each communication line, a cable mate detecting portion for detecting mating or unmating of a communication cable, and a switch processing portion for performing a switching process of the plural communication lines. The switch processing portion includes a switch requesting portion for transmitting a request to switch the line and the address in the buffer corresponding to data that are already received by the terminal to the server in accordance with a predetermined instruction including a signal from the cable mate detecting portion, a switch instruction receiving portion for receiving a switch instruction transmitted from the server and the address in the buffer corresponding to data that are already received by the server, and a switch executing portion for executing the switching to the communication line designated by the switch instruction and for synchronizing the buffer of the terminal with the server side.

The present invention also provides a line switching system comprising the above-mentioned server and terminal.

According to the above-mentioned server, terminal and line switching system, in a local area network using plural types of communication lines, when the terminal switches the communication line to be connected, the buffers in the server and the terminal are synchronized with each other, and streaming information can be transmitted to the terminal via the server continuously and smoothly.

BRIEF DESCRIPTION OF THE DRAWINGS

FIG. 13 is a block diagram of a conventional line switching system in a usual home network.

DESCRIPTION OF THE PREFERRED EMBODIMENTS

Hereinafter, the present invention will be explained more in detail with reference to embodiments and drawings.

Figure 1:
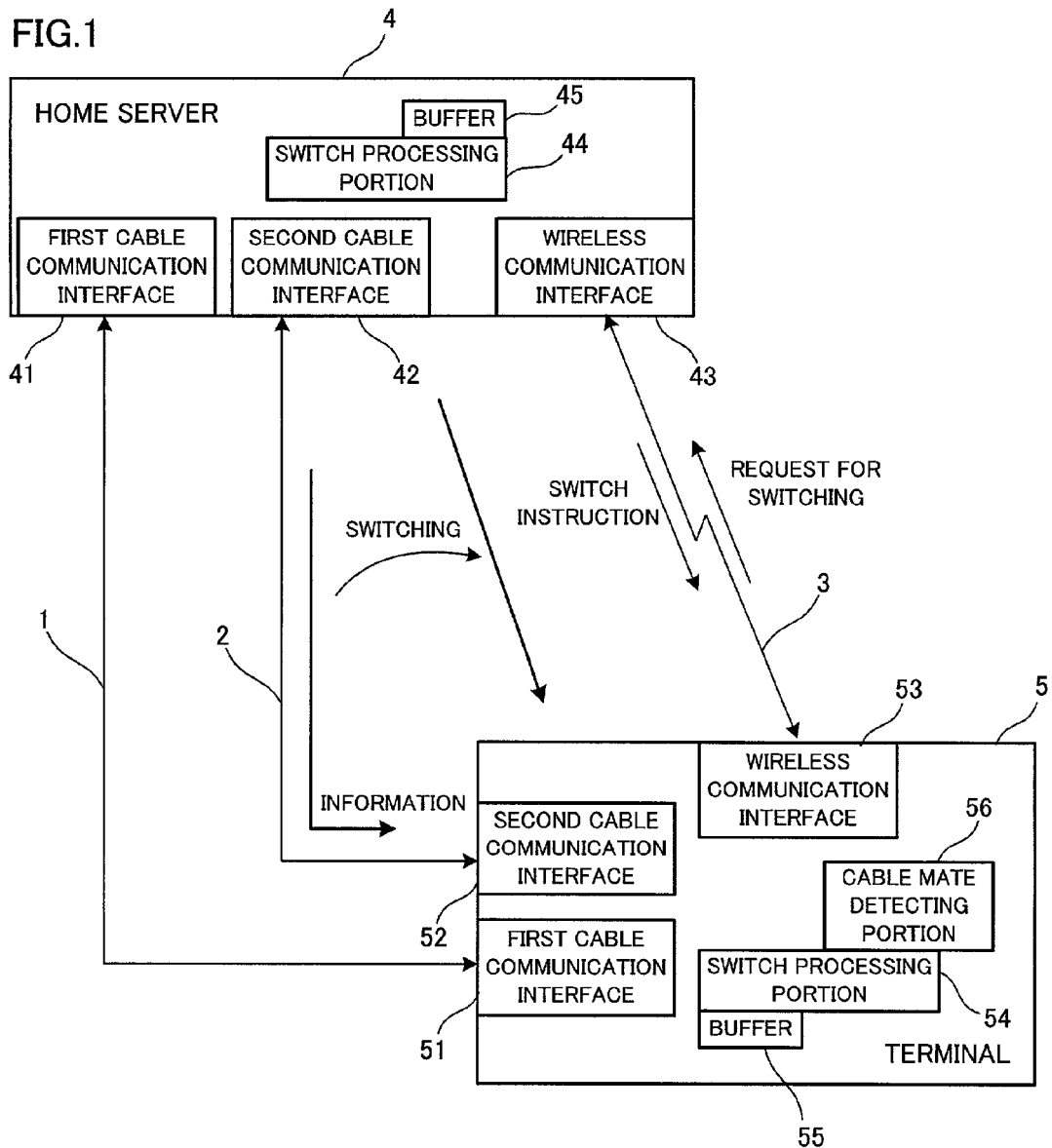
FIG. 1 is a block diagram showing a first example of a line switching system according to the present invention.

FIG. 1 is a block diagram showing a first example of a line switching system according to the present invention. In this example, a home network is built using three types of communication lines including a first cable communication line 1 utilizing a power-line carrier, a second cable communication line 2 of Ethernet (a trademark) utilizing an unshielded twisted pair (UTP) cable and a wireless communication line 3 based on the standard IEEE802.11.

This home network includes a home server 4 (a type of router) connected to the Internet via a public network, and plural (only one is shown in FIG. 1) terminals (e.g. personal computers) 5 connected to the home server 4. The home server 4 is equipped with a first cable communication interface 41, a second cable communication interface 42 and a wireless communication interface 43, for supporting three types of communication lines. In addition, a switch processing portion 44 for executing a process of switching the lines and a buffer 45 accompanying the switch processing portion 44 are also provided to the home server 4. Similarly, the terminal 5 comprises a first cable communication interface 51, a second cable communication interface 52 and a wireless communication interface 53. The terminal 5 also comprises a switch processing portion 54 for switching lines and a buffer 55 accompanying the switch processing portion 54. In addition, the terminal 5 comprises a cable mate detecting portion 56 for detecting mating or unmating of the communication cable.

FIG. 1 shows switching of lines between the home server 4 and a terminal (a note type personal computer) 5. More specifically, it shows the case where the terminal 5 is moved, and the communication line between the terminal 5 and the network (i.e., the communication line between the terminal 5 and the home server 4) is switched from the second cable communication line 2 to the other line (the wireless communication line 3).

In the terminal 5, when the UTP cable of the second cable communication line 2 is unmated from the connector of the second cable communication interface 52, the cable mate detecting portion 56 detects the unmating state. According to this detection signal, the switch processing portion 54 works and transmits a request to switch the line and the serial number (i.e., the address in the buffer 55) of the data that are already received to the home server 4. On this occasion, if any cable communication line is not connected to the terminal 5, the wireless communication line 3 is used temporarily.

When receiving the request to switch the line and the address in the buffer from the terminal 5, the home server 4 selects an optimal communication line among plural communication lines that are currently connected to the terminal 5. This selection is performed in accordance with the type of the data under being transmitted (e.g., streaming information or not), a transfer rate of each communication line, communication quality, using state of other terminals and others. The home server 4 transmits an instruction of switching to the selected communication line and the serial number (i.e., the address in the buffer 45) of the data that are already received by the home server 4 to the terminal 5. Thus, synchronization between the home server 4 and the terminal 5 is made, so that line switching without lack of transferred data is realized.

Each of the buffer 45 in the switch processing portion 44 of the home server 4 and the buffer 55 in the switch processing portion 54 of the terminal 5 is divided into a transmission buffer and a reception buffer, both of which have memory capacity sufficient for continuing to supply data to the application during the period from cutting of one line to connecting of the other line so as to restart the data transmission in the line switching process. When the line switching is performed, the contents of the buffers of the lines are exchanged. In addition, the request for switching issued from the terminal 5 to the home server 4 and the switch instruction issued from the home server 4 to the terminal 5 are processed by the switch processing portion 44 or 54 directly without being stored in the buffer, in contrast to the packet of the transfer data.

Figure 2:
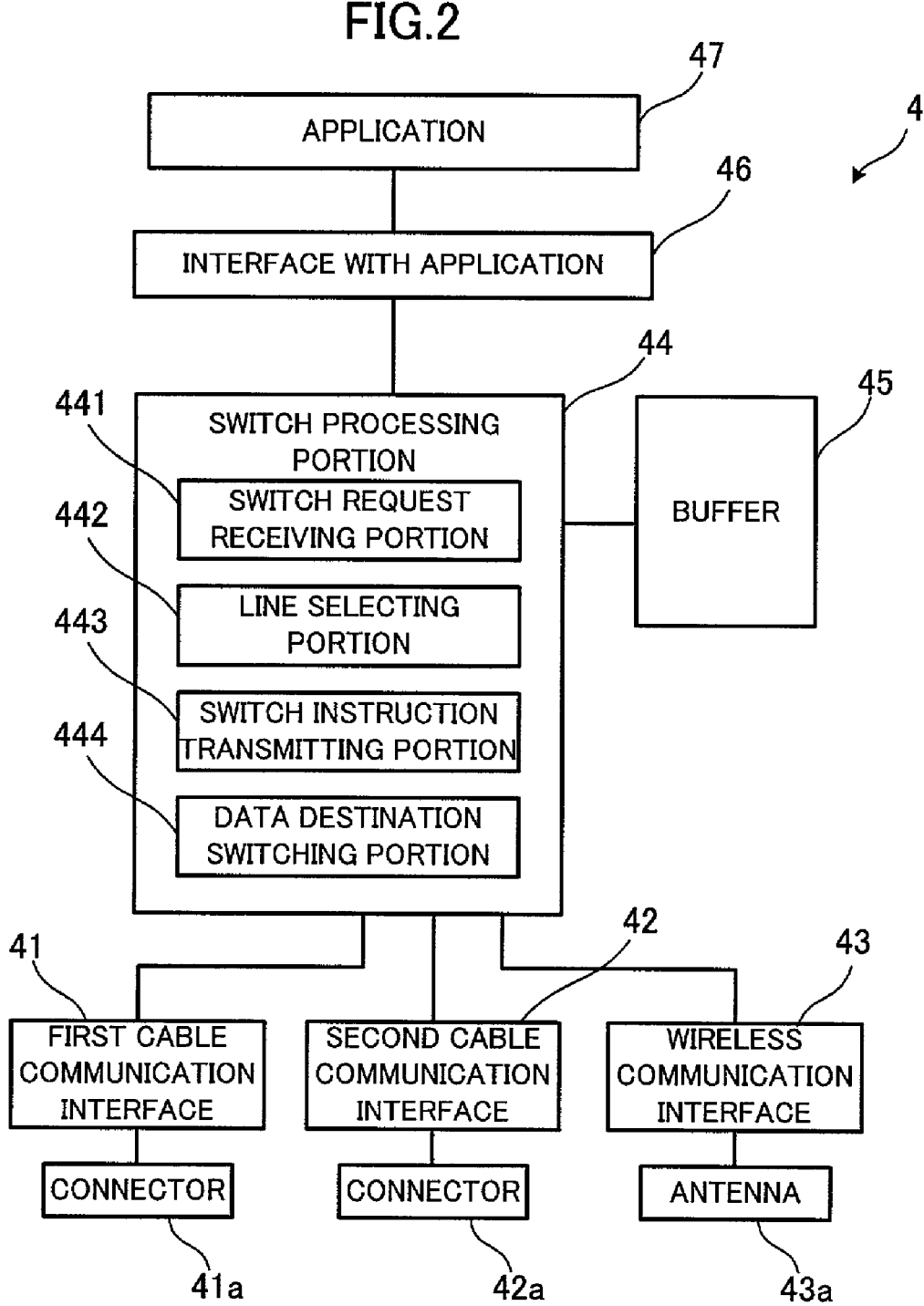
FIG. 2 is a block diagram showing a first example of an inner structure of a home server.

FIG. 2 is a block diagram showing a first example of the inner structure of the home server 4. A line switching mechanism of the home server 4, which is made mainly of the switch processing portion 44, is connected to the application 47 via an interface 46 such as PCI, USB or PCMCIA. The line switching mechanism is viewed like a network interface from the application 47.

The switch processing portion 44 includes a switch request receiving portion 441 for receiving the request to switch the line transmitted from the terminal 5 and the address in the buffer 55 corresponding to the data that are already received by the terminal 5, a line selecting portion 442 for selecting an appropriate communication line in response to the request to switch the line, a switch instruction transmitting portion 443 for transmitting the instruction of switching to the selected communication line and the address in the buffer 45 corresponding to the data that are already received by the home server 4, and a data destination switching portion 444 for transferring the packet data that were received for the terminal 5 corresponding to the communication line before the switching to the communication line after the switching.

The first and the second cable communication interfaces 41 and 42 are connected with connectors 41a and 42a, respectively. The wireless communication interface 43 is connected with an antenna 43a.

The buffer 45 cumulates transmission data or reception data of each communication line for predetermined quantity. Namely, the buffer 45 cumulates data that were transmitted or received via each communication interface 41, 42 or 43 for each MAC (media access control) address.

Figure 3:
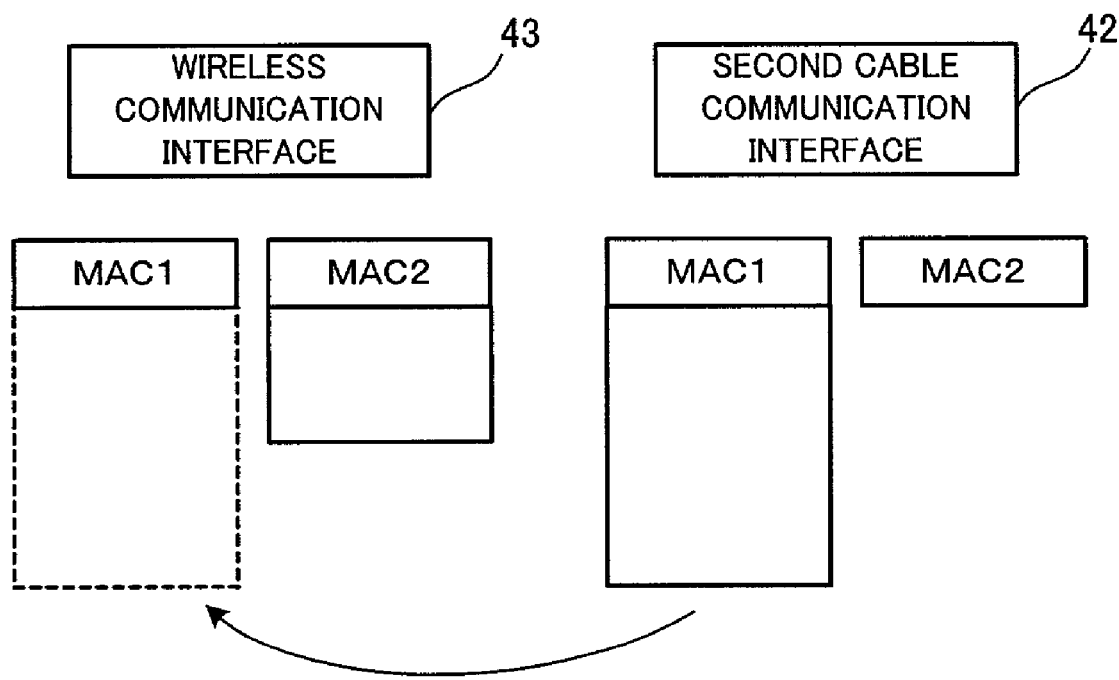
FIG. 3 shows an example of a copy process that is performed in a buffer when a line is switched.

FIG. 3 shows an example of the copy process that is performed in the buffer when the line is switched. If the MAC address of the terminal 5 is changed when the communication line is switched, the MAC address is rewritten and is copied to the destination. In the example shown in FIG. 3, the communication line is switched from the second cable communication line 2 to the wireless communication line 3, when the contents of MAC1 of the second cable communication interface 42 is copied to MAC2 of the wireless communication interface 43. After that, packets that are transmitted to the MAC address are also rewritten concerning the MAC address and are copied to the buffer region of the communication interface of the destination.

Figure 4:
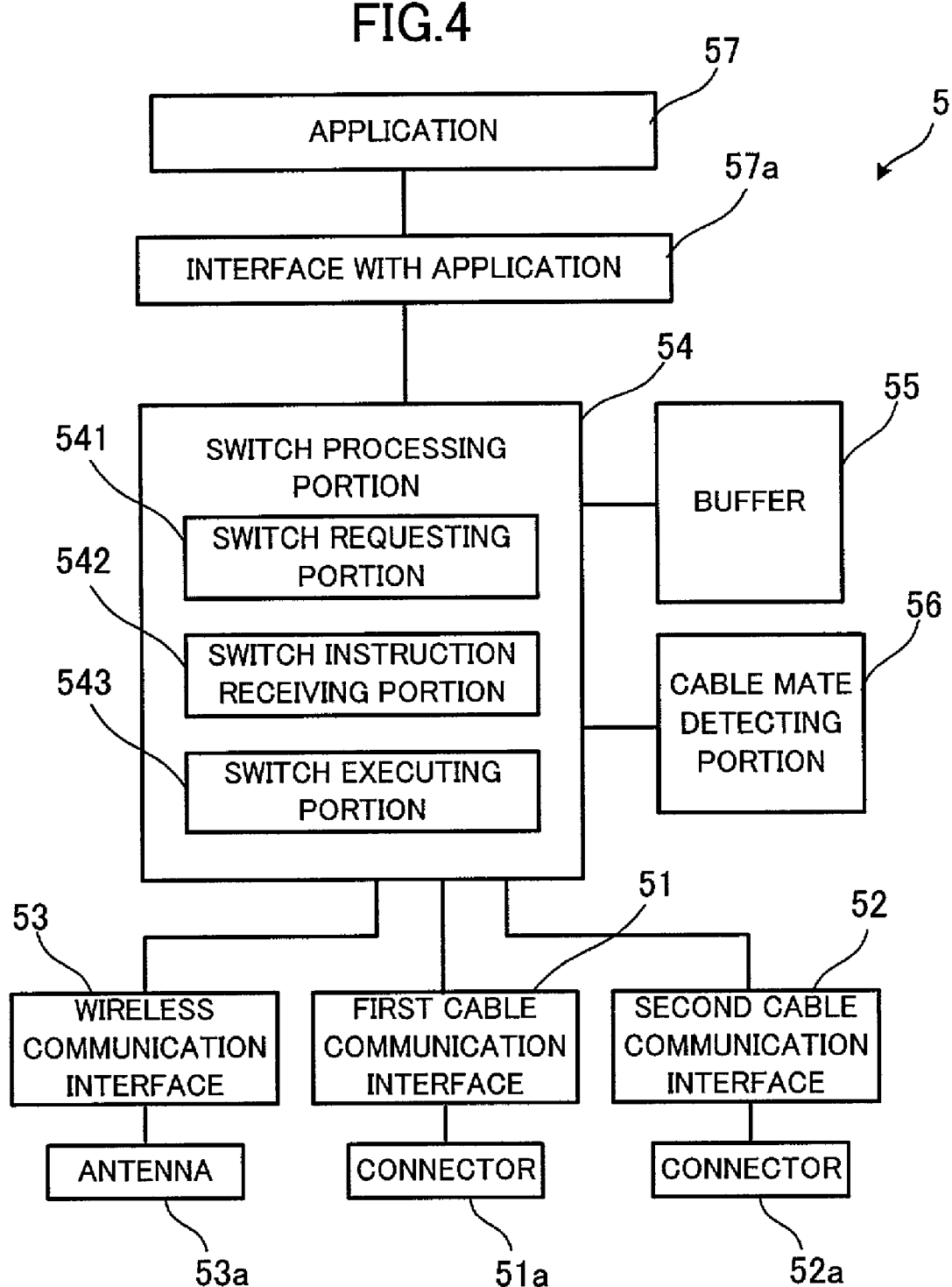
FIG. 4 is a block diagram showing an example of an inner structure of a terminal.

FIG. 4 is a block diagram showing an example of the inner structure of the terminal 5. A line switching mechanism of the terminal 5, which is made mainly of the switch processing portion 54, is connected to the application 57 via an interface 57a such as PCI, USB or PCMCIA. The line switching mechanism is viewed like a network interface from the application 57.

The switch processing portion 54 includes a switch requesting portion 541 for transmitting the request to switch the line and the address in the buffer 55 corresponding to the data that are already received by the terminal 5 to the home server 4 in accordance with a signal from the cable mate detecting portion 56 or an instruction by user's directions (an operation of the terminal 5), a switch instruction receiving portion 542 for receiving the switch instruction transmitted from the home server 4 and the address in the buffer 45 corresponding to the data that are already received by the home server 4, and a switch executing portion 543 for executing the switch to the communication line designated by the switch instruction and for synchronizing the buffer 55 of the terminal 5 with the home server 4 side.

The first and the second cable communication interfaces 51 and 52 are connected with connectors 51a and 52a, respectively. The wireless communication interface 53 is connected with an antenna 53a.

The buffer 55 cumulates transmission data or reception data transmitted or received by the terminal 5 for the latest predetermined quantity. When transmitting the request for switching to the home server 4, the terminal 5 adds an ID and the MAC address of the currently effective communication line (that is used for the communication with the home server 4) for the transmission. The ID of the communication line is used for identifying a type of the communication line such as a power-line carrier, Ethernet (a trademark) or a wireless communication.

Figure 5:
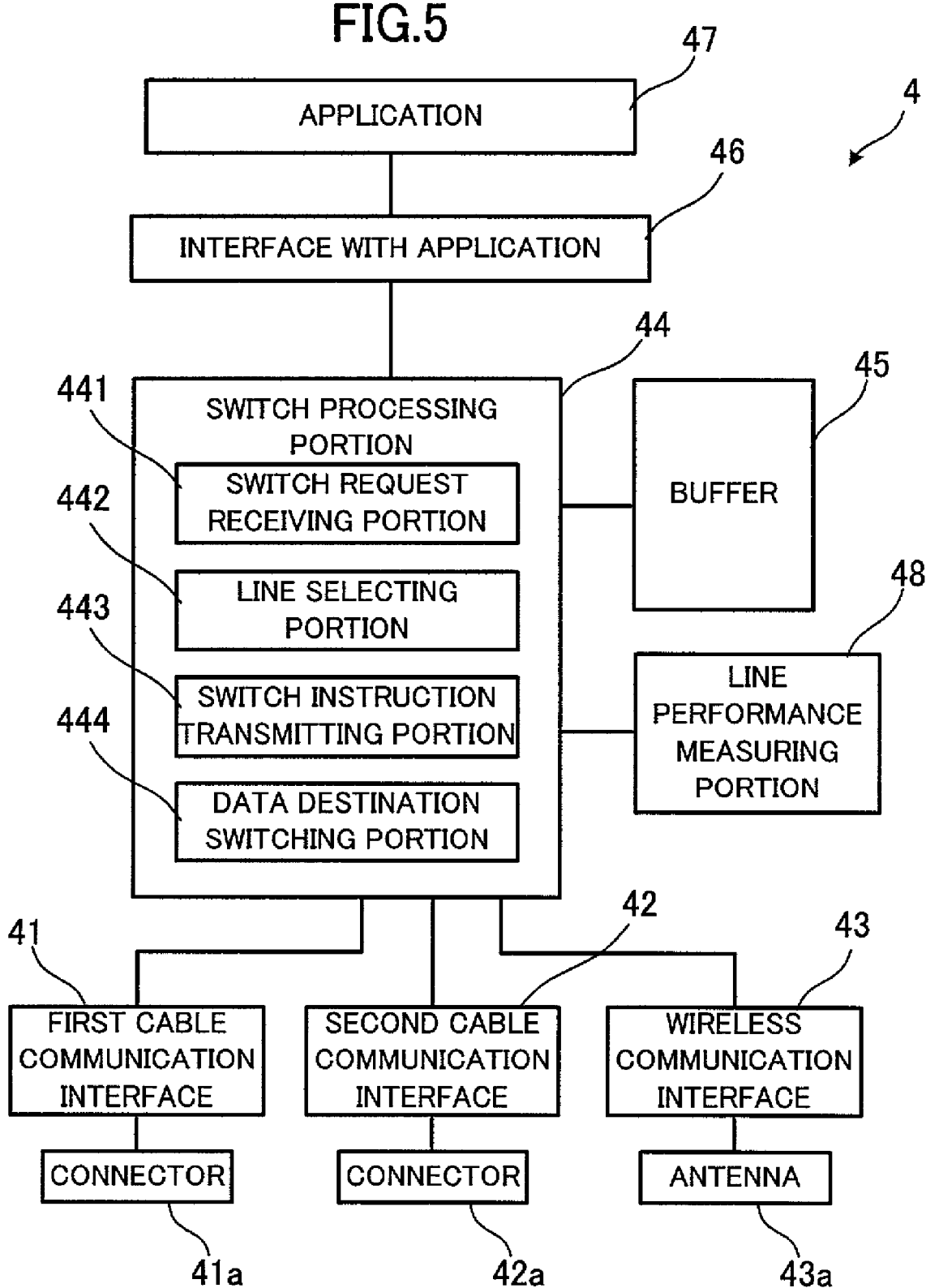
FIG. 5 is a block diagram showing a second example of the inner structure of the home server.

FIG. 5 is a block diagram showing a second example of the inner structure of the home server 4. In this example, a line performance measuring portion 48 is added to the structure of the home server 4 shown in FIG. 2. The line performance measuring portion 48 measures performance of each of the communication lines 1, 2 and 3, such as a communication speed, an S/N ratio or an error packet number, and saves the measurement result. The measurement is performed by analyzing transmission or reception of packets that are not cumulated in the buffer 45 or packets transmitted or received via each of the communication interfaces 41–43. In accordance with this measurement result, the line selecting portion 442 selects an appropriate communication line.

The measurement of the performance of the communication lines 1, 2 and 3 can be performed all the time or at a regular interval by the line performance measuring portion 48. Otherwise, it can be performed only when the switch request receiving portion 441 receives the request to switch the line from the terminal 5.

Figure 6:
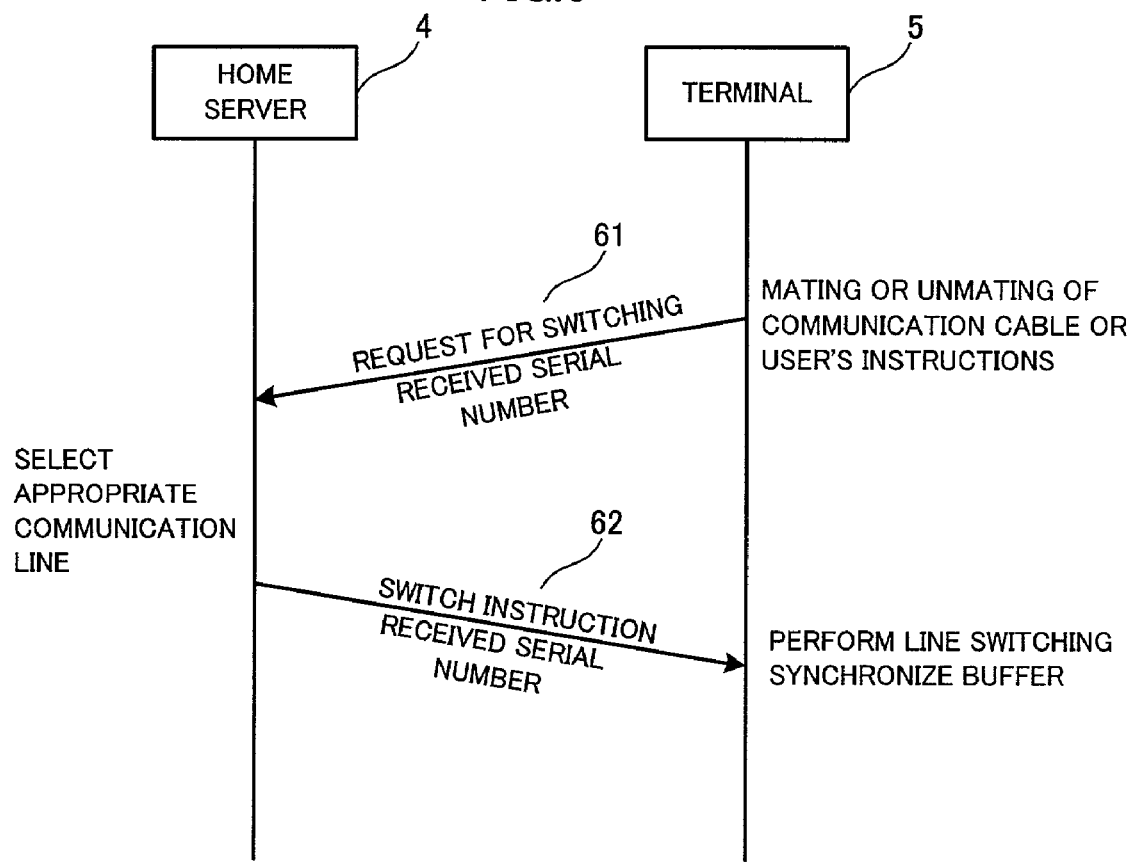
FIG. 6 shows a communication diagram between the home server and the terminal.
Figure 7:
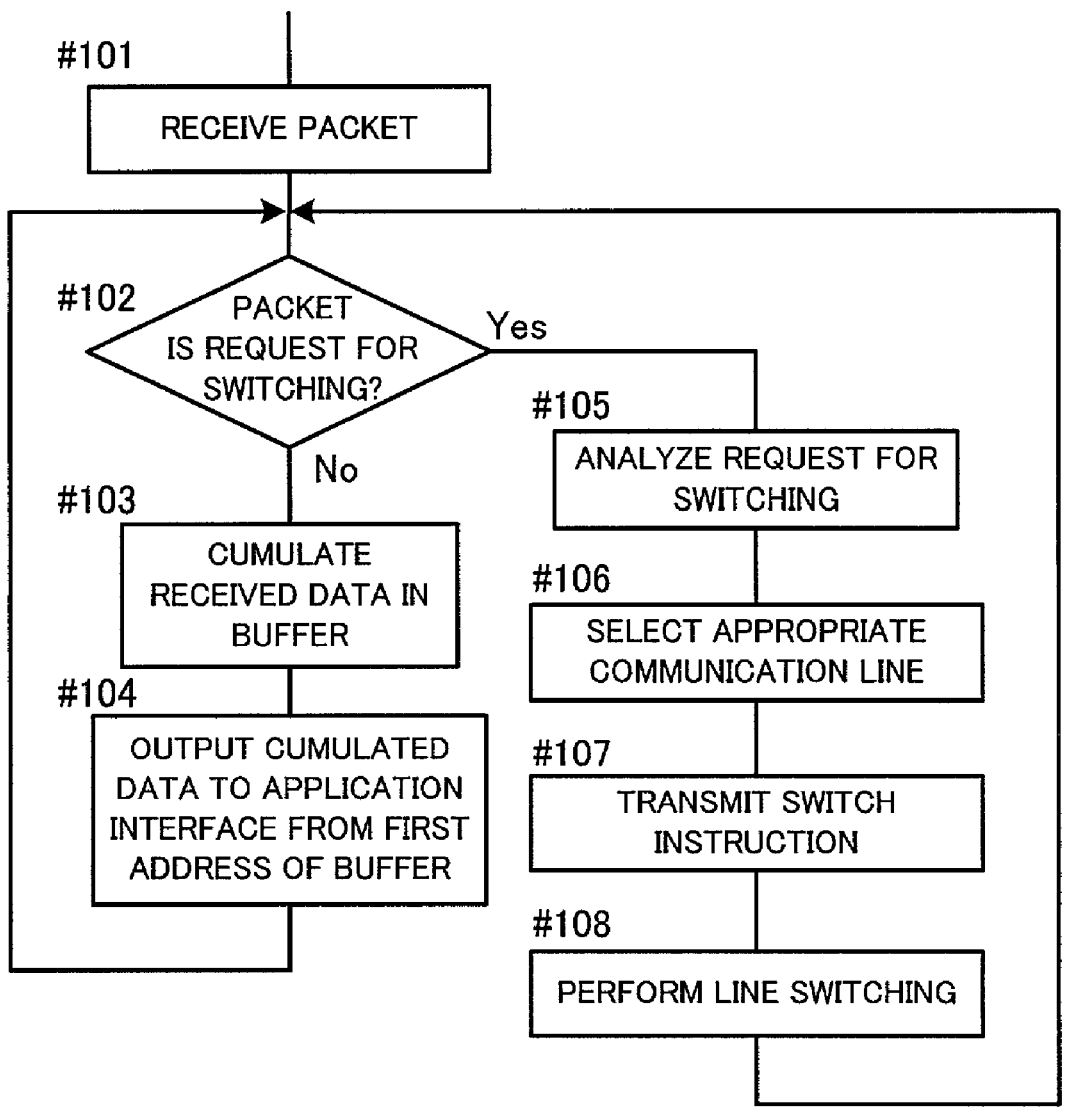
FIG. 7 is a flowchart of processes executed by the home server.
Figure 8:
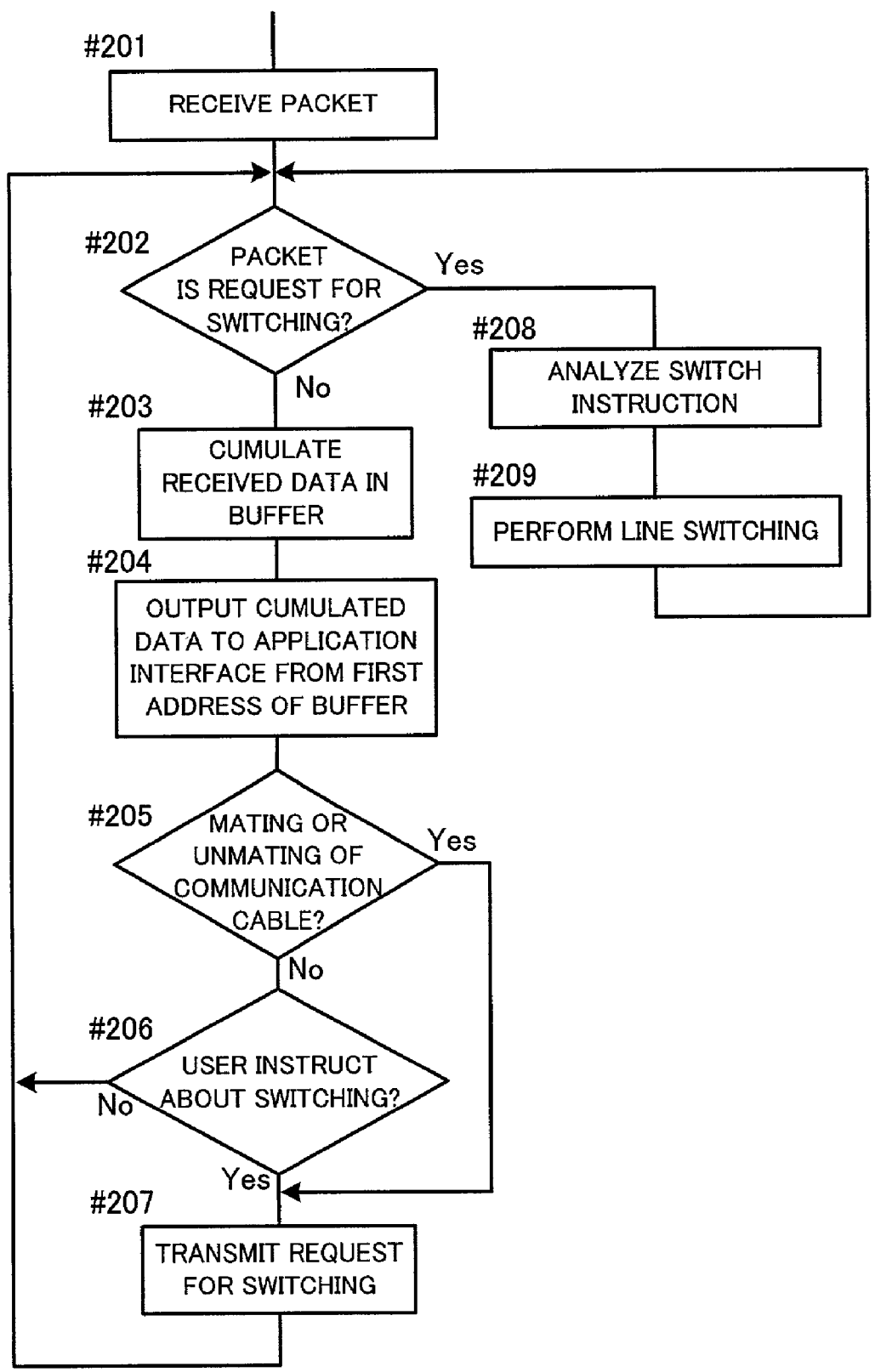
FIG. 8 is a flowchart of processes executed by the terminal.

FIG. 6 shows a communication diagram between the home server 4 and the terminal 5. In addition, flowcharts of processes executed by the home server 4 and the terminal 5 are shown in FIGS. 7 and 8, respectively. With reference to these figures, the processes executed by the home server 4 and the terminal 5 concerning the switching of the communication line will be explained below.

As explained above, when the terminal 5 is moved and the cable mate detecting portion 56 detects mating or unmating of the communication cable, or when the user instructs the switching, the request for switching 61 is transmitted from the terminal 5 to the home server 4 (Step #205–207 in FIG. 8). On this occasion, if the cable communication lines 1 and 2 cannot be used for example, the wireless communication line 3 is used. Together with the request for switching 61, the serial number (the received serial number), i.e., the address in the buffer of the data that are already received is transmitted.

After receiving the packet from the terminal 5 (Step #101 in FIG. 7), the home server 4 decides whether the packet is the request for switching or not (Step #102). If the packet is not the request for switching, the received data are cumulated in the buffer 45 (Step #103), and the cumulated data are outputted to the interface 46 with the application from the first address of the buffer 45 (Step #104). If the packet is the request for switching, the request for switching is analyzed (Step #105), and an appropriate communication line is selected as explained above (Step #106). Then, the instruction 62 to switch to the selected communication line is transmitted to the terminal 5 (Step #107). The serial number, i.e., the address in the buffer of the data that are already received by the home server 4 is attached to the switch instruction 62. In addition, the home server 4 performs the switching process of the communication line to the terminal 5 (Step #108).

After receiving the packet from the home server 4 (Step #201 in FIG. 8), the terminal 5 decides whether the packet is the switch instruction or not (Step #202). If the packet is not the switch instruction, the received data are cumulated in the buffer 55 (Step #203), and the cumulated data are outputted to the interface 57*a* with the application from the first address of the buffer 55 (Step #204). If the packet is the switch instruction, the switch instruction is analyzed (Step #208), and the switching to the designated communication line is performed (Step #209). On this occasion, in accordance with the received serial number (the address in the buffer), the buffers are synchronized.

Figure 9:
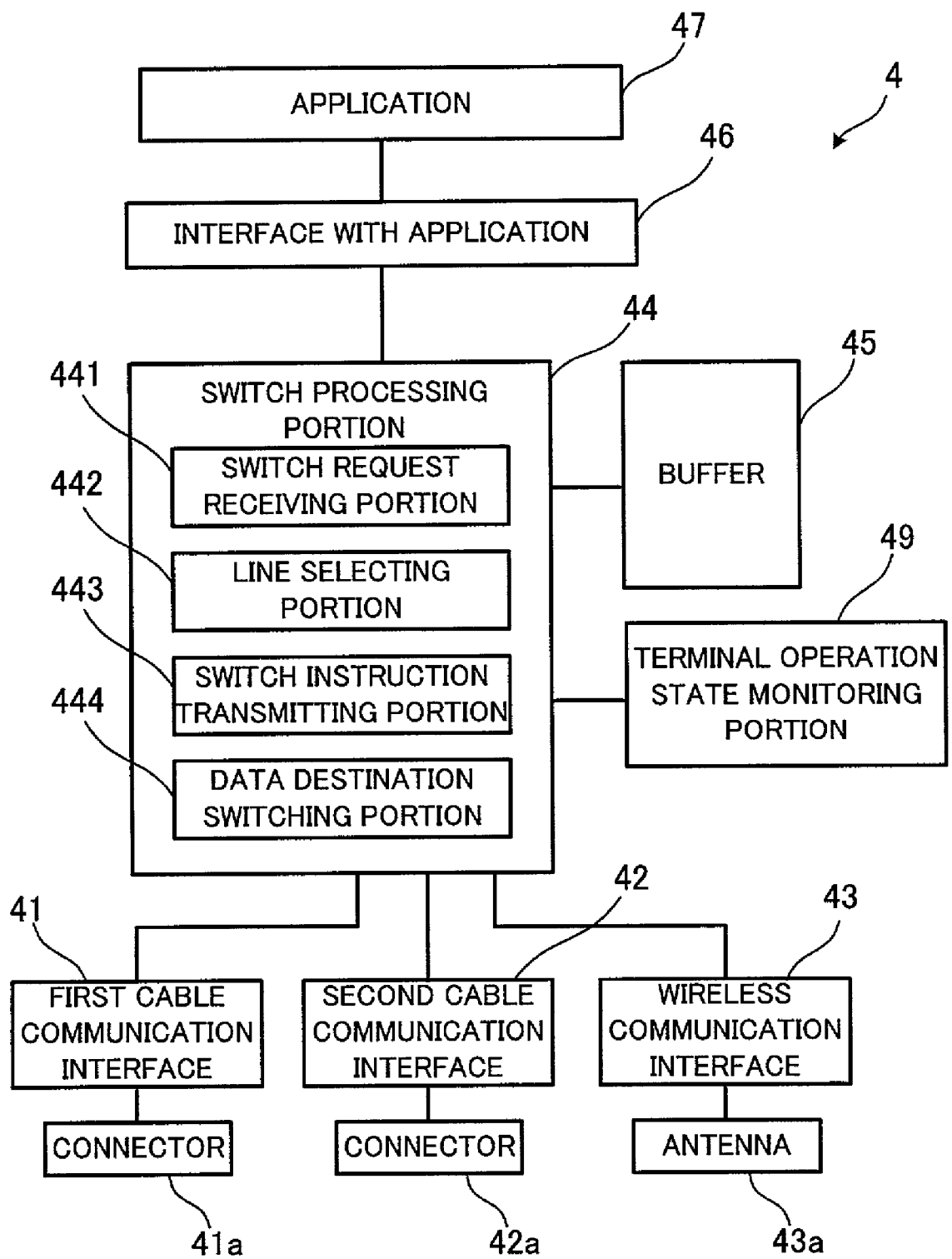
FIG. 9 is a block diagram showing a third example of the inner structure of the home server.

FIG. 9 is a block diagram showing a third example of the inner structure of the home server 4. In this example, a terminal operation state monitoring portion 49 is added to the structure of the home server 4 shown in FIG. 2. The terminal operation state monitoring portion 49 transmits a predetermined instruction (e.g., a status requesting instruction) to the terminal 5. If there is no response to the instruction from the terminal 5 in a predetermined period, the terminal operation state monitoring portion 49 informs the application 47 of the fact (via the interface 46).

For example, supposing that a power supply to the terminal 5 is cut off before it finishes the communication with the home server 4 successfully and that the state is left, then the streaming information continues to run toward the terminal 5 in the communication line in vain. In this case, the communication line cannot be allocated to another communication. By providing the above-mentioned terminal operation state monitoring portion 49 to the home server 4, the application 47 can be informed (with means such as an interrupt process) of the fact that there is no response from the terminal 5 due to the stop of the power supply to the terminal 5 during the communication process or other accident. Thus, the application 47 can stop the wasteful transmission of the streaming information and use the communication line effectively.

Figure 10:
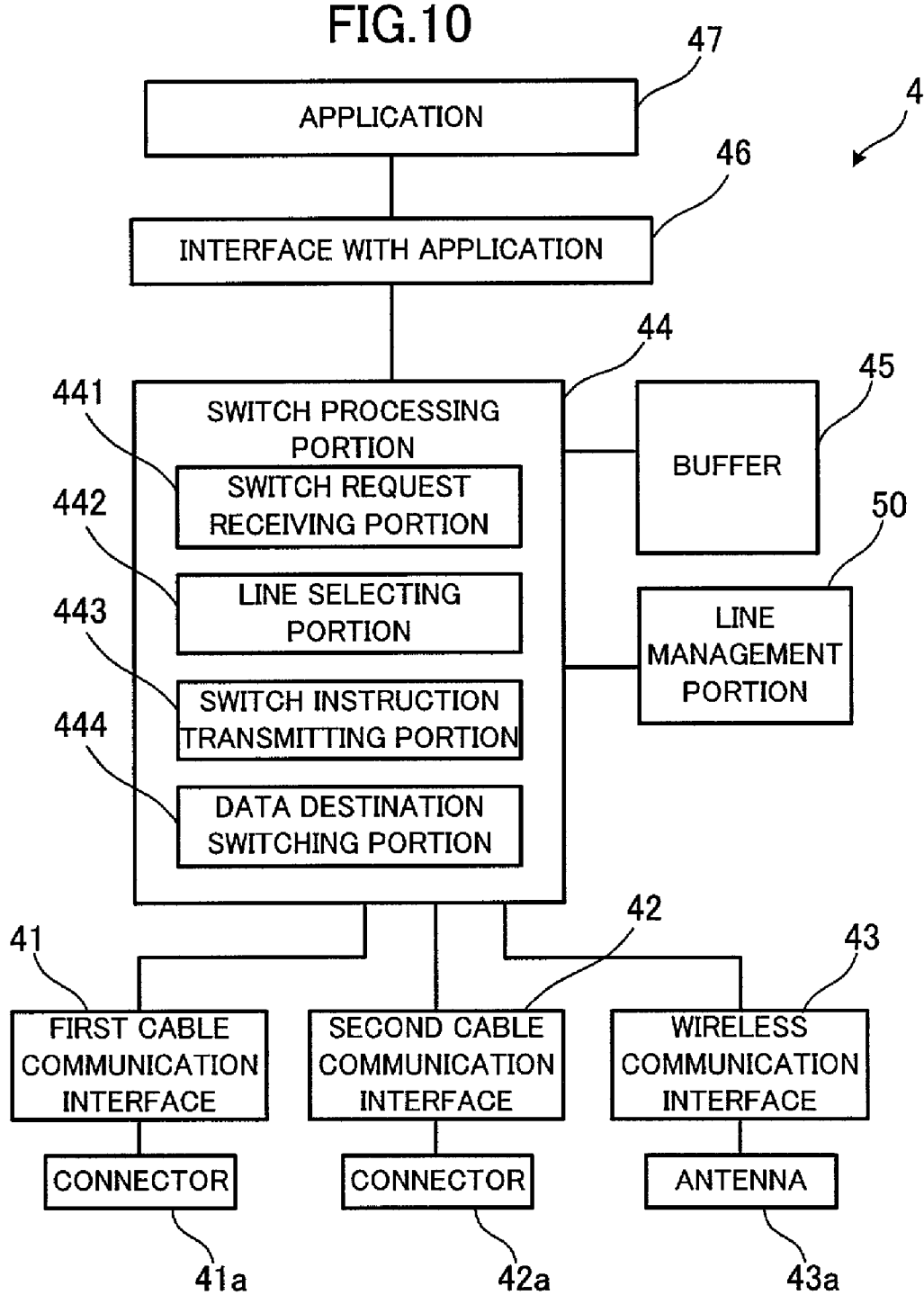
FIG. 10 is a block diagram showing a fourth example of the inner structure of the home server.

FIG. 10 is a block diagram showing a fourth example of the inner structure of the home server 4. In this example, a line management portion 50 is added to the structure of the home server 4 shown in FIG. 2. The line management portion 50 detects the communication lines 1, 2 and 3 under being used by each terminal 5 and traffics thereof, and the line selecting portion 442 selects an appropriate communication line in accordance with the detection result of the line management portion 50.

In addition, the switch processing portion 44 including the line selecting portion 442 may issue a line switching instruction to the terminal 5 except one that transmitted the request to switch the line in accordance with the detection result of the line management portion 50, so as to perform the switching of the communication line. Then, the switch processing portion 44 may allocate the communication line that has become free by the switching process to the terminal 5 that transmitted the request to switch the line.

Figure 11:
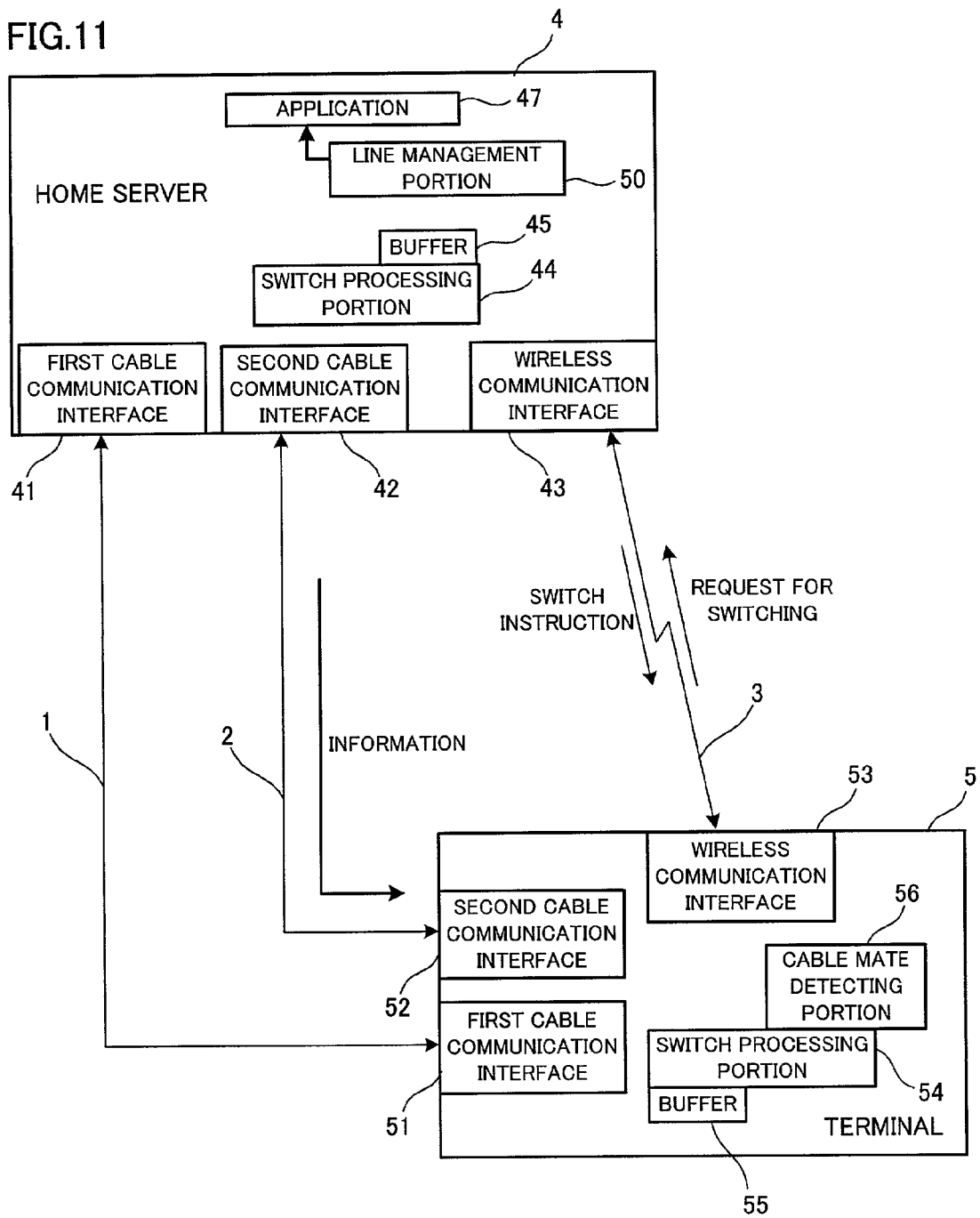
FIG. 11 is a block diagram showing a second example of the line switching system according to the present invention.

FIG. 11 is a block diagram showing a second example of the line switching system according to the present invention. In this example, at least either the home server 4 or the terminal 5 (the home server 4 in FIG. 11) includes the line management portion 50 in contrast to the example shown in FIG. 1. The line management portion 50 memorizes variation of the communication speed due to the switching of the communication line in the past. When switching of the communication line occurs, the line management portion 50 read out of the memory data the variation of the communication speed due to the switching of the communication line, so as to inform the application 47 of the variation of the communication speed using an interrupt process. Thus, the application 47 can predict the variation of the communication speed before the communication line is switched. For example, if the communication speed will be decreased, the application 47 can convert the data transfer rate of the streaming information for transmission, so that dropping of frame data can be minimized.

Also in the terminal 5 side, the application can predict the variation of the communication speed before the communication line is switched if the line management portion having the similar function is provided. For example, in the case where the terminal 5 is a video camera, the data transfer rate may be switched so that dropping of frame data can be minimized.

Figure 12:
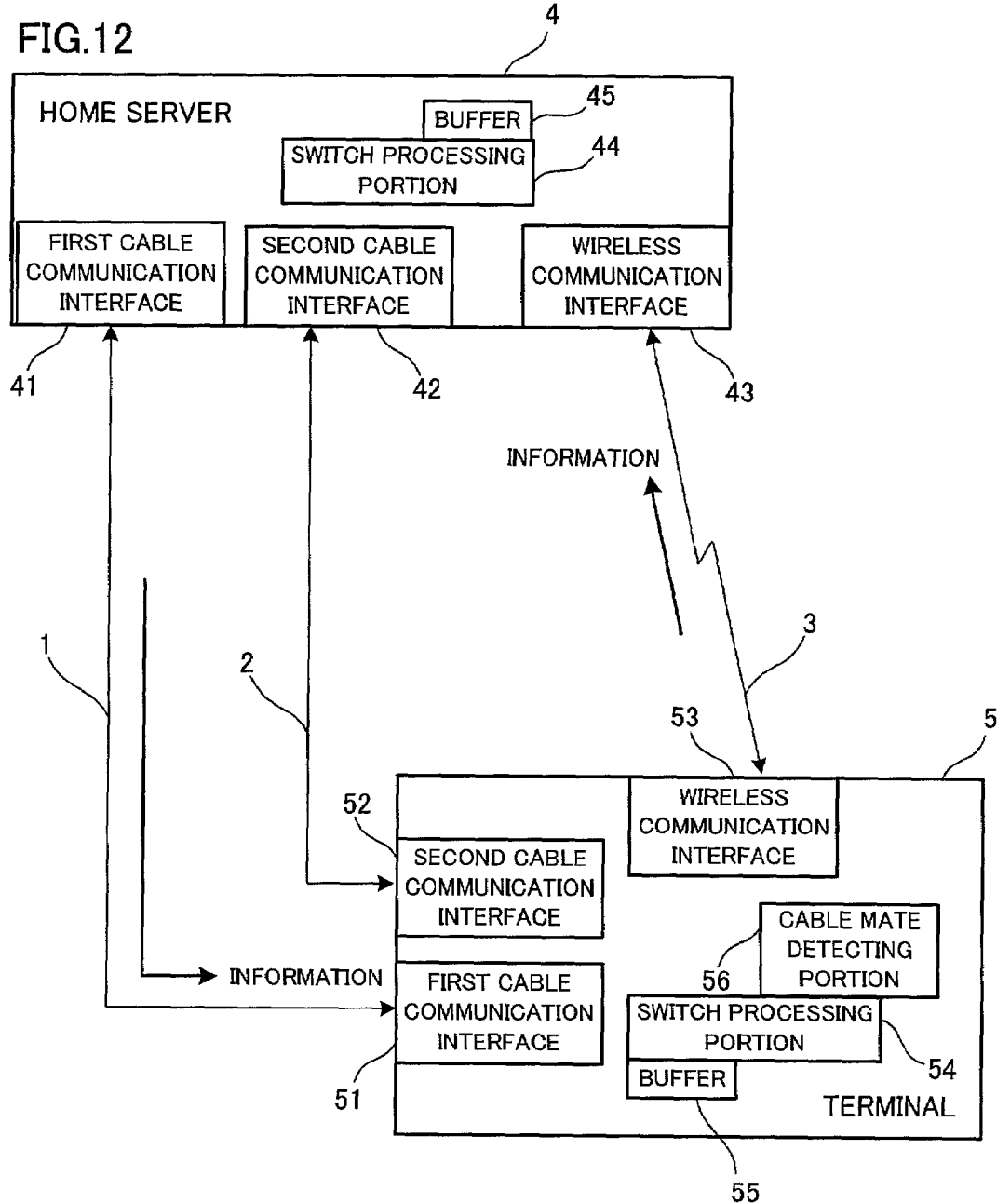
FIG. 12 is a block diagram showing a third example of the line switching system according to the present invention.

FIG. 12 is a block diagram showing a third example of the line switching system according to the present invention. In this example, when the switching of the communication line occurs, the first communication line (the first cable communication line 1) is allocated to the communication from the home server 4 to the terminal 5, and the second communication line except the first communication line (the wireless communication line 3) is allocated to the communication from the terminal 5 to the home server 4. Namely, viewing from the home server 4 or the terminal 5, different communication lines are allocated to the transmission and the reception. In this way, a vacant communication line can be used effectively so as to enable high speed transfer of the streaming information. In this case, both the switch processing portions 44 and 54 of the home server 4 and the terminal 5 perform the switching process including synchronization of the buffers 45 and 55.

In the above-mentioned embodiment, the request to switch the line that is transmitted from the terminal 5 can include a candidate of the communication line to be used after the switching. In this case, the line selecting portion 442 in the switch processing portion 44 of the home server 4 selects the candidate of the communication line included in the request to switch the line transmitted from the terminal 5 as an appropriate communication line. Namely, when the home server 4 selects the communication line after the switching, the candidate of the communication line that was sent from the terminal 5 to the home server 4 is regarded as a first choice.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A server of a local area network in which the server is connected to a terminal via a communication line selected from a plurality of communication lines, the server comprising:
   a buffer for cumulating a predetermined quantity of latest transmission or reception data in each communication line for each MAC address that is unique to the communication line; and
   a switch processing portion for performing a switching process of the plurality of communication lines, including
      a switch request receiving portion for receiving from the terminal a request to switch the communication line and an address in the buffer indicating data received by the terminal,
      a line selecting portion for selecting an appropriate communication line in response to the request to switch the communication line,
      a switch instruction transmitting portion for transmitting an instruction to switch to the selected communication line and the address in the buffer indicating data received by the server, and
      a data destination switching portion for transferring packet data received for the terminal to the communication line after the switching, by rewriting a MAC address of packet data received and stored before the switching and a MAC address of packet data to be received after the switching, and by copying both the packet data to a buffer area of a MAC address corresponding to the communication line after the switching.

2. A server as recited in claim 1, further comprising a line performance measuring portion for measuring a performance of each of the plurality of communication lines including a communication speed, wherein the line selecting portion selects the appropriate communication line in accordance with measurement result of the line performance measuring portion.

3. A server as recited in claim 2, wherein the line performance measuring portion measures performances including communication speeds of the plurality of communication lines when the switch request receiving portion receives the request to switch the communication line from the terminal.

4. A server as recited in claim 1, further comprising a terminal operation state monitoring portion for monitoring an operation state of the terminal, wherein the terminal operation state monitoring portion transmits a predetermined instruction to the terminal and if there is no response from the terminal in a predetermined period, the terminal operation state monitoring portion informs an application of the fact about no response.

5. A server as recited in claim 1, further comprising a line management portion for detecting communication lines that each of a plurality of terminals uses for connecting to the server and traffics of the communication lines, wherein the line selecting portion selects the appropriate communication line in accordance with detection result of the line management portion.

6. A server as recited in claim 5, wherein the switch processing portion issues a line switching instruction to a terminal except the terminal that transmitted the request to switch the communication line in accordance with the detection result of the line management portion so as to perform a switching process of the communication line and allocates a communication line that has become free by the switching process to the terminal that transmitted the request to switch the communication line.

7. A terminal of a local area network in which the terminal is connected to a server via a communication line selected from a plurality of communication lines, the terminal comprising:
   a buffer for cumulating a predetermined quantity of latest transmission or reception data in each communication line for each MAC address that is unique to the communication line;
   a cable mate detecting portion for detecting a mating or unmating state of a communication cable; and
   a switch processing portion for performing a switching process of the plurality of communication lines, including
      a switch requesting portion for transmitting to the server a request to switch the communication line and an address in the buffer indicating data received by the terminal in accordance with a predetermined instruction including a signal from the cable mate detecting portion,
      a switch instruction receiving portion for receiving a switch instruction transmitted from the server and the address in the buffer indicating data received by the server, and
      a switch executing portion for executing the switching to the communication line designated by the switch instruction and for synchronizing the contents of the buffer of the terminal with that of the server in accordance with the address in the buffer received from the server.

8. A line switching system of a local area network in which a server is connected to a terminal via a communication line selected from a plurality of communication lines, wherein the server comprises:
   a buffer for cumulating transmission or reception data for the latest predetermined quantity in each communication line for each MAC address that is unique to the communication line; and
   a switch processing portion for performing a switching process of the plurality of communication lines, including
      a switch request receiving portion for receiving from the terminal a request to switch the communication line and an address in the buffer indicating data received by the terminal,
      a line selecting portion for selecting an appropriate communication line in response to the request to switch the communication line,
      a switch instruction transmitting portion for transmitting an instruction of switching to the selected communication line and an address in the buffer indicating data received by the server, and
      a data destination switching portion for transferring packet data received from the terminal to the communication line after the switching, by rewriting a MAC address of packet data received and stored before the switching and a MAC address of packet data to be received after the switching, and by copying both the packet data to a buffer area of a MAC address corresponding to the communication line after the switching, and the terminal comprises:

a buffer for cumulating a predetermined quantity of latest transmission or reception data in each communication line for each MAC address that is unique to the communication line;

a cable mate detecting portion for detecting mating or unmating state of a communication cable; and a switch processing portion for performing a switching process of the plurality of communication lines, including a switch requesting portion for transmitting to the server a request to switch the communication line and the address in the buffer indicating data received by the terminal in accordance with a predetermined instruction including a signal from the cable mate detecting portion, a switch instruction receiving portion for receiving a switch instruction transmitted from the server and an address in the buffer indicating data received by the server, and a switch executing portion for executing the instruction to switch to the communication line designated by the switch instruction and for synchronizing contents of the buffer of the terminal with that of the server in accordance with the address in the buffer received from the server.

9. A line switching system as recited in claim 8, wherein at least one of the server and the terminal further comprises a line management portion for memorizing a variation of a communication speed when the communication line was switched and for reading out the memorized variation of the communication speed so as to inform an application when the switching occurs.

10. A line switching system as recited in claim 8, wherein when the switching of the communication line occurs, a first communication line is allocated to a communication from the server to the terminal, while a second communication line other than the first communication line is allocated to a communication from the terminal to the server.

11. A line switching system as recited in claim 8, wherein the request to switch the communication line transmitted from the terminal includes a candidate for the communication line to be used after the switching, and the line selecting portion in the switch processing portion of the server selects the communication line included in the request to switch the line from the terminal as an appropriate communication line.

* * * * *